May 18, 1937.    S. J. GREEN    2,080,419
PROCESS FOR PRODUCING HIGHER FATTY ALCOHOLS
Filed Feb. 15, 1935
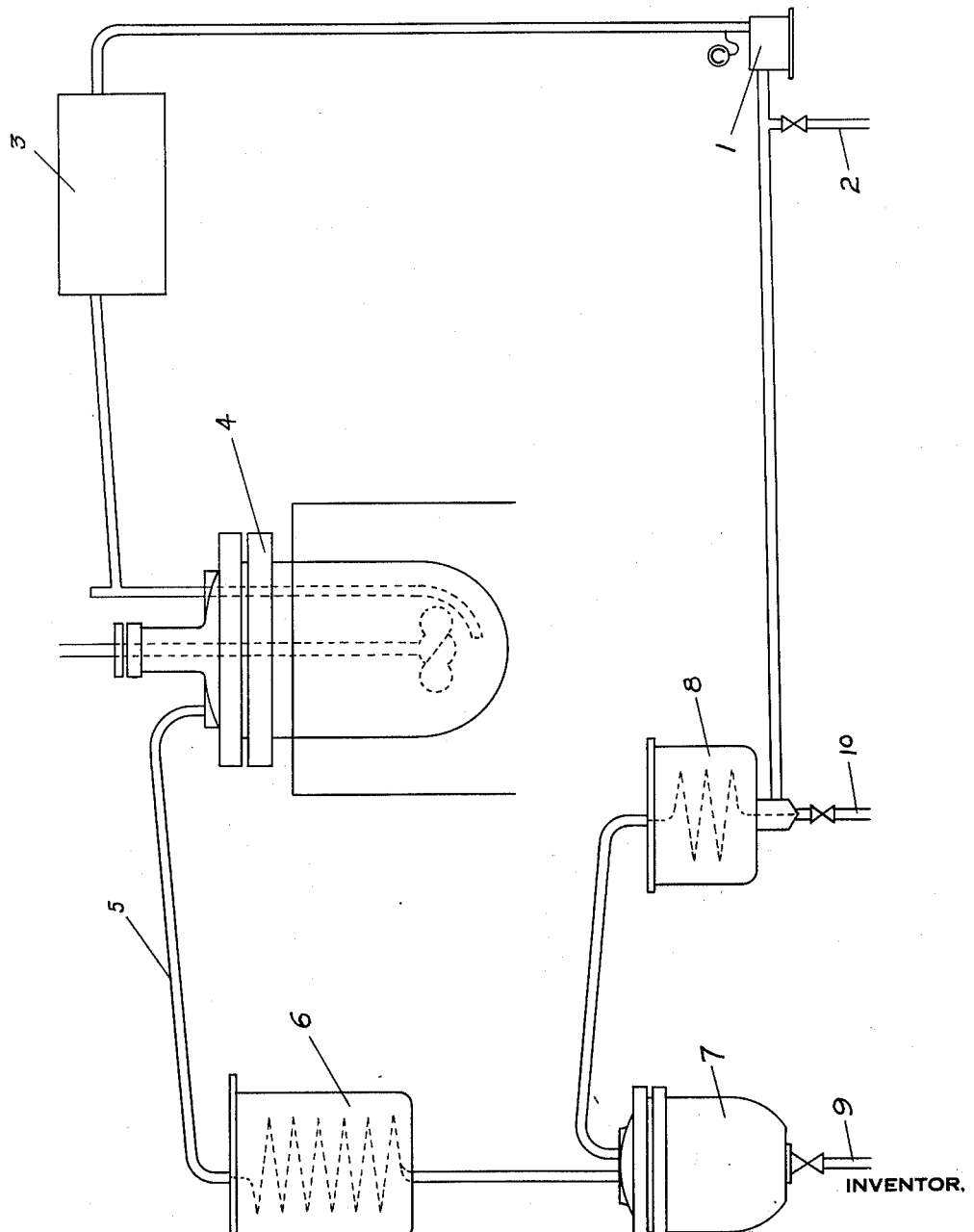
INVENTOR.
Stanley Joseph Green.
BY
ATTORNEY Patented May 18, 1937

2,080,419

UNITED STATES PATENT OFFICE 2,080,419

PROCESS FOR PRODUCING HIGHER FATTY ALCOHOLS

Stanley Joseph Green, Blackley, Manchester, England

Application February 15, 1935, Serial No. 6,756
In Great Britain February 16, 1934

10 Claims. (Cl. 260—156)

This invention relates to a process for producing higher fatty alcohols by reducing the corresponding fatty acids or glycerides or other esters.

Heretofore higher fatty alcohols have been produced by saponifying spermaceti or other esters of higher fatty alcohols, or by reducing higher fatty acids with sodium and lower alcohols, this latter process being commonly referred to as the Bouveault and Blanc reaction. Likewise, these alcohols have been produced by catalytic hydrogenation of higher fatty acids and esters. This catalytic hydrogenation was usually accomplished by treating higher fatty acids or their esters with hydrogen under extremely high pressures, in contact with a suitable catalyst. Because of the high pressures required for this latter reaction the necessary equipment was quite expensive and the reaction was furthermore subject to the objection that it frequently went too far, resulting in the production of valueless hydrocarbons. In order to avoid these disadvantages it has been proposed to operate under a lower hydrogen pressure by vaporizing the fatty acid or ester and passing it in admixture with hydrogen over a suitable catalyst—see Schmidt, Ber. der Deutschen Chem. Gesselschaft 1931, 64B, 2051. However, a vapor process of this type is not practical on a large scale.

It is an object of the present invention to remedy the aforementioned defects of the prior art and the numerous additional defects which directly or indirectly result therefrom. A further object is to reduce carboxyl-containing compounds by a process which comprises the catalytic hydrogenation of carboxyl-containing compounds, but does not require the delicate control or expensive equipment formerly necessary. A still further object is to reduce higher fatty acids and esters by a process which is efficient and economical. A still further object is to devise a process for producing higher fatty alcohols which permits the use of lower pressures, but which does not require vaporization of the material to be reduced. Additional objects will become apparent from a consideration of the following description and claims.

These objects are attained according to the herein described invention which broadly comprises suspending a suitable hydrogenation catalyst in a liquid carboxyl-containing compound, maintaining such suspension at elevated temperatures and superatmospheric pressures, said pressures being considerably less than is taught by the art, and rapidly passing through the suspension a stream of hydrogen. In a more restricted sense the invention is directed to the production of higher fatty alcohols from higher fatty acids and their esters by suspending an alcohol producing catalyst in said compound, maintaining under elevated temperatures and pressures, and rapidly passing therethrough a stream of hydrogen gas. The aforementioned process is characterized in that the amount of hydrogen passed through the suspension is considerably greater, whereas the pressure during the reaction is appreciably lower than heretofore. In its preferred embodiment the invention pertains to the reduction of naturally occurring oils, fats and waxes, in particular cocoanut and palm kernel oils, by suspending in said compounds a non-ferrous hydrogenating catalyst, preferably chromites or chromates, for example copper chromite, heating said suspension to a temperature above 200° C., and preferably in the neighbourhood of 300° C., and rapidly passing therethrough a stream of hydrogen gas in a quantity which is considerably greater but under a pressure which is appreciably lower than heretofore. In its preferred embodiment the amount of hydrogen used increases directly as the pressure and also directly as the amount of charge. An amount of hydrogen within the range of 40-60 cubic feet per minute, measured at atmospheric pressure, is used per 1000 pounds of pressure per 400 pounds of material to be reduced. If either the pressure or the amount of material to be reduced is increased, the volume of hydrogen required is increased proportionately.

In the practical application of this invention the material to be reduced may be continuously or intermittently passed into a heated autoclave. A suitable hydrogenating catalyst or mixture thereof in finely divided form is added to the charge either before or after it is passed into the autoclave, preferably the former. Hydrogen, which may advisably be preheated, is rapidly passed through the aforementioned suspension in the autoclave. The rapid passage of hydrogen through said suspension results in a vigorous agitation thereof, although it is also contemplated that such agitation may be increased by means of a mechanical stirrer. This agitation is a characteristic feature of the process of the invention, being necessary to give adequate contact between the material to be reduced, the catalyst, and the hydrogen. Unreacted hydrogen is drawn out of the autoclave in admixture with higher alcohols, and a small amount of fatty acids or esters or by-products which may be carried over by entrainment. This mixture may then be passed through a condenser into a receiver. From the receiver the condensate is withdrawn, while unreacted hydrogen may be returned to the system. The aforementioned outline of the practical means of carrying out this invention is readily understood by one familiar with the art and may be modified considerably without departing from the scope of this invention.

As previously mentioned, the material to be reduced is preferably an oil, fat or wax of natural occurrence. Among the compounds coming within this category mention may be made of coconut oil, palm kernel oil, Montan wax, carnauba wax, cottonseed oil, linseed oil, castor oil, olive oil, China-wood oil, herring oil, sperm oil, wool fat, beeswax, higher fatty acids, containing eight or more carbon atoms such as caprylic, capric, lauric, myristic, palmitic, stearic, oleic, ricinoleic, linoleic, etc. acids, and glycerides, or other esters of the aforementioned and related acids. The alcohols produced are in general the higher fatty alcohols such as octyl, decyl, lauryl, myristyl, cetyl, stearyl, oleyl, ricinoleyl and linoleyl alcohols. In place of individual materials to be reduced it is to be understood that mixtures thereof may be used. Likewise, the products may contain a mixture of alcohols rather than any individual alcohol. Such mixture of alcohols and other materials may be used as such, or the alcohols may be isolated from the remaining materials and used alone or in admixture with one another.

The aforementioned or related materials which are to be reduced are passed into an autoclave. This operation may be either intermittently or continuously, preferably it is continuous. The temperatures at which the fatty acids and esters are maintained during reduction are well known to one familiar with the art. In general, it may be stated that temperatures previously used for catalytic reduction of these compounds for the production of higher fatty alcohols are suitable. Such temperatures may be varied from about 200° C. to about 400° C. Usually, temperatures within the range of about 225–350° C. will be sufficient. However, it is understood that the invention is not restricted to any given temperature range.

The pressure under which the charge is maintained during reaction is considerably lower than in the ordinary catalytic reduction process of this type. It may be stated that the customary reaction wherein fatty acids and esters are converted to higher fatty alcohols by means of catalytic hydrogenation may be modified in respect to pressure by selecting a pressure which is from 25–90% lower than usual. Pressures within the range of about 20 to about 150 atmospheres, and in particular the lower portion of this range have been found to be quite satisfactory. For example, palmitic acid may be reduced to cetyl alcohol under a pressure of about 30 atmospheres.

The amount of hydrogen used is ordinarily appreciably greater than in the usual reactions of this type. Since the amount of hydrogen depends upon numerous factors such as the material to be reduced, the amount of such material, and the pressure, it is clear that definite figures concerning this amount of hydrogen would be subject to certain inaccuracies. For convenience, however, the quantity of hydrogen utilized might be compared with that formerly necessary, and in this connection it may be said that an amount which is from 20 to more than 100% greater than heretofore required may be used. It has been found that from 40–60 cubic feet per minute of hydrogen (measured at atmospheric pressure) per 1000 pounds pressure per 400 pounds of material to be reduced gives very satisfactory results. For the reduction of coconut and palm kernel oils excellent yields of higher alcohols were obtained by selecting approximately 50 cubic feet of hydrogen per minute per 1000 pounds pressure per 400 pounds of oil. An increase in either the pressure or the amount of charge should be compensated for by a proportionate increase in the amount of hydrogen passed into the system.

Since the invention is not restricted to any particular catalyst or catalysts, and since hydrogenating catalysts are well known no attempt will be made herein to give an exhaustive description of the various catalysts which are contemplated. Briefly, it may be stated that metals such as nickel, cobalt, copper, iron, platinum, zinc, palladium and their oxides are suitable. Moreover, acidic oxides such as those of silicon, aluminium, tungsten, chromium, molybdenum and vanadium may be used with satisfactory results. In particular, non-ferrous metals which have hydrogenating properties are helpful. Chromites and chromates of these non-ferrous metals are especially useful, for example, copper chromite and mixtures of chromites and chromates of zinc, cadmium and copper have given excellent results. Catalysts contemplated for use herein are described in considerable detail in U. S. applications Serial No. 520,473 filed March 5, 1931 and Serial No. 739,417, filed August 11, 1934. The instructions of the aforementioned applications, insofar as they pertain to hydrogenating catalysts, are contemplated for use herein and are intended to form a part hereof in the same manner as if they were incorporated herein. The remaining instructions of the aforementioned applications, when modified in accordance with the present invention, are also to be considered as included herein.

The catalyst is preferably suspended in finely divided form in the material to be reduced prior to passage of such material into the reaction zone. However, the particular manner of incorporating the catalyst into the material to be reduced is not to be construed as a limitation upon the scope of this invention. Suffice it is to say that for optimum results the catalyst should be suspended in such material during the hydrogenation reaction, and should preferably be thoroughly distributed through such material.

While it is not intended to limit this invention to any particular theory, nevertheless it is probable that this invention owes its superiority to the intimate contact between the material to be reduced, the catalyst and fresh hydrogen, which is obtained by using a greater amount of hydrogen than is ordinarily considered necessary. Moreover, the rapidity with which hydrogen is circulated through the reaction zone results in the speedy removal of the alcohols produced. Consequently, the tendency of such desirable products to be converted to hydrocarbons or other undesirable by-products is minimized.

By means of the present invention an efficient and economical source of higher fatty alcohols is rendered available. The cost of equipment for carrying out this process is considerably less than in the case of prior art catalytic hydrogenation processes. Likewise, the delicate manipulation which was heretofore necessary is practically completely eliminated. The process may be operated continuously, and results in a high yield of desirable products.

It is a feature of the invention to use a particular form of apparatus wherein the process described may be carried out. This apparatus is illustrated by the accompanying drawing and by the following description which also includes the mode of operating with it.

Hydrogen is circulated through the reaction system by means of a pump, 1. An inlet for admitting fresh hydrogen is provided by the valve 2. The gas is circulated through the preheater 3, passing thence to the reaction vessel 4, which is heated to the desired temperature. This vessel contains the compound which it is desired to reduce, and the catalyst in powder form. The mixture of substance to be reduced and catalyst is vigorously agitated by the stirrer shown in the drawing. This may be of any convenient shape, the shape being however designed and the velocity of rotation being so adjusted that the most vigorous agitation, irrespective of that caused by the passage of the gas, is provided. Outflowing hydrogen, carrying volatile products of reaction passes by the pipe 5 to the condenser 6, and the condensate is collected in the receiver 7. The hydrogen then passes to a second cooler when water is removed and thence back to the pump for re-circulation. The condensates are removed from the system intermittently or continuously through pipes 9 and 10, which are fitted with suitable valves. The reaction vessel 4 is provided with an inlet (not shown), through which the substance, which is to be reduced and also when necessary fresh catalyst as necessary may be introduced without interrupting the continuous working of the process.

The drawing is, of course, illustrative only. It is advantageous so to arrange the piping that unit 3 is a heat-exchanger, i. e., so that the preheater is itself heated by the gases passing along pipe 5. This, and other modifications of the arrangement depicted, whereby it is made more suitable for working, will suggest themselves to those skilled in the art.

The invention will be illustrated by reference to the following detailed example wherein spermaceti (which is largely cetyl palmitate) is converted almost wholly into an alcohol mixture, chiefly cetyl alcohol.

The catalyst used in the embodiment of the invention is preferably that described by Connor, Folkers and Adkins (Journal of the American Chemical Society, 1932, 54, 1138) which can be regarded as a barium copper chromite. Into a pressure vessel provided with a stirrer rotating at about 1000 R. P. M. 500 parts of spermaceti and 50 parts of the catalyst are introduced. The spermaceti is melted and the stirrer then put into operation. Suitably purified hydrogen is then passed into the vessel until a pressure of 40 atmospheres is reached, whereupon it is circulated at that pressure and at such a speed that the hydrogen in the pressure vessel is wholly changed about every five minutes. (Note: the space inside the pressure vessel is about eight times that occupied by the spermaceti.) When the temperature reaches 260–300° C. cetyl alcohol passes over with the hydrogen. It is condensed and collected as described. The purity of the material so obtained is over 90%. A little spermaceti passes over.

I claim:

1. A process for producing higher fatty alcohols from higher fatty acids and esters which comprises suspending a non-ferrous hydrogenating catalyst in the substance to be reduced, maintaining such suspension under a temperature of above 200° C. and a pressure of between 20 and 150 atmospheres, and rapidly passing therethrough a stream of hydrogen gas, the amount of such hydrogen gas being sufficient to remove from the reaction zone the higher fatty alcohols produced before said alcohols are further reduced.

2. The process of claim 1 wherein the amount of hydrogen passed through the suspension per 1000 pounds of pressure and per 400 pounds of material to be reduced is within the range of 40–60 cubic feet per minute, measured at atmospheric pressure.

3. The process of claim 1 wherein the amount of hydrogen passed through the suspension per 1000 pounds of pressure and per 400 pounds of material to be reduced is approximately 50 cubic feet per minute, measured at atmospheric pressure.

4. The process of claim 1 wherein the catalyst is a chromite of a non-ferrous metal and wherein the amount of hydrogen passed through the suspension per 1000 pounds of pressure and per 400 pounds of material to be reduced is within the range of 40–60 cubic feet per minute, measured at atmospheric pressure.

5. The process of claim 1 wherein the catalyst is copper chromite and wherein the amount of hydrogen passed through the suspension per 1000 pounds of pressure and per 400 pounds of material to be reduced in approximately 50 cubic feet per minute, measured at atmospheric pressure.

6. In the process for producing higher fatty alcohols by the catalytic hydrogenation of higher fatty acids and esters under elevated temperatures and superatmospheric pressures the step which comprises maintaining a superatmospheric pressure of less than 150 atmospheres upon the reactants while rapidly passing therethrough a stream of hydrogen in sufficient quantities to remove therefrom the higher fatty alcohols produced before any substantial amount of said alcohols is further reduced.

7. In the process for producing fatty alcohols containing at least eight carbon atoms from higher fatty acids and esters by passing hydrogen through a suspension of said materials and a hydrogenating catalyst maintained under elevated temperatures and superatmospheric pressures the step which comprises maintaining a superatmospheric pressure of less than 150 atmospheres upon the aforesaid suspension while rapidly passing therethrough a stream of hydrogen in sufficient quantities to remove therefrom the higher fatty alcohols produced before any substantial amount of said alcohols is further reduced.

8. The process of claim 7 wherein the amount of hydrogen is within the range of 40 to 60 cubic feet per minute, measured at atmospheric pressure, per 1000 pounds pressure per 400 pounds of material to be reduced.

9. The process of claim 7 wherein the amount of hydrogen is approximately 50 cubic feet per minute, measured at atmospheric pressure, per 1000 pounds pressure per 400 pounds of material to be reduced.

10. A process for producing cetyl alcohol which comprises heating an agitated suspension of spermaceti and a hydrogenating catalyst comprising barium copper chromite to a temperature of about 260° C. and passing therethrough hydrogen under a pressure of about 40 atmospheres at a rate of about 8/5 volumes of hydrogen per volume of suspension per minute.

STANLEY JOSEPH GREEN.